2,786,150

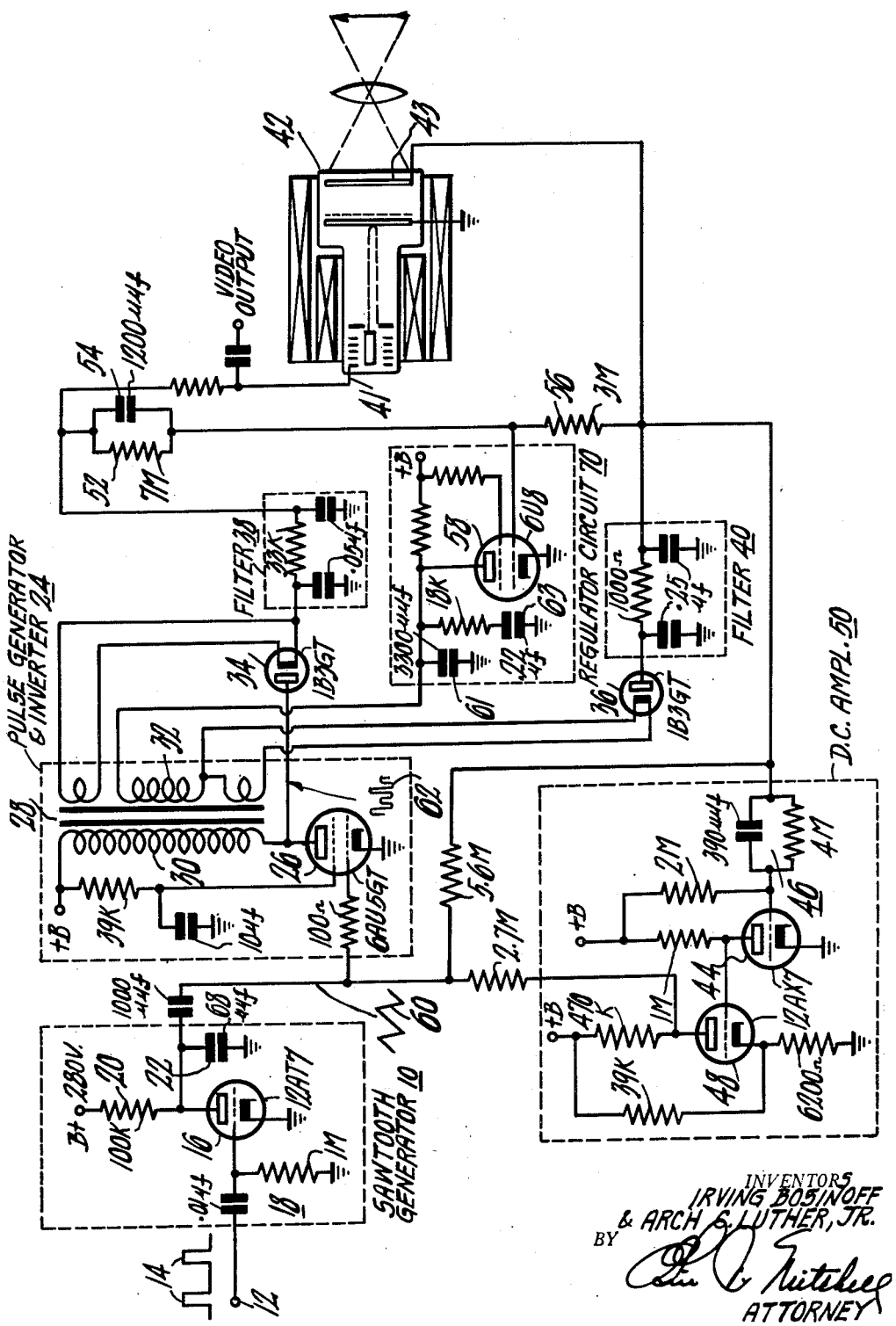

VOLTAGE SUPPLY SYSTEM

Irving Bosinoff, Haddon Heights, and Arch C. Luther, Jr., Merchantville, N. J., assignors to Radio Corporation of America, a corporation of Delaware Application July 9, 1954, Serial No. 442,332

11 Claims. (Cl. 307—106)

This invention relates to systems for generating regulated voltages and more particularly to systems for generating substantially constant positive and negative voltages.

Present television cameras employing image orthicon pickup tubes require a negative voltage for photocathode electrodes, and a positive voltage for dynode electrodes, or electron multiplier elements. The signal output of the image orthicon will vary considerably if its dynode voltage is varied, and therefore the dynode voltage must be well stabilized. Variations in the negative voltage supplied to the photocathode electrode impairs the focus of the electrostatic image upon the scanned target of the image orthicon, and in a color camera the registration of the three color images may also be impaired. It is therefore essential that both the positive voltage applied to the dynode electrodes and the negative voltage applied to the photocathode electrode voltage be well regulated.

The invention in its more general form contemplates the generation of both positive and negative regulated voltages in the following manner:

A positive pulse is generated and then inverted to form a negative pulse, a voltage sensing circuit then senses the amplitude of the negative pulse and controls the pulse generator to create an amplitude variation in both of the pulses commensurate with the difference between the actual amplitude of the negative pulses and the desired amplitude. In this manner the negative pulse voltage becomes amplitude regulated. Regulation of the positive pulses is affected by shifting the reference level potential or A. C. axis of both the negative and positive pulses by means of a regulator circuit acting in conjunction with the pulse inverter. The positive and negative pulses may then be rectified and filtered to form constant voltages. The sensing circuits may be adapted to operate directly from the rectified and filtered voltages.

It is therefore an object of this invention to provide an improved regulated voltage generating circuit.

Another object of this invention is to provide an improved circuit for simultaneously generating both positive and negative regulated voltages.

A further object of this invention is to provide a voltage generating circuit having a plurality of output voltages, and having improved regulation.

Other and incidental objects of this invention will be apparent to those skilled in the art from reading the following specification and on inspection of the accompanying drawing in which there is shown a circuit diagram representing one form of the invention.

Referring to the drawing in detail there is shown a sawtooth generator 10 having an input terminal 12 which is adapted to receive input pulses 14. The sawtooth generator 10 consists of a vacuum tube 16 having an input circuit 18 and an output circuit. The input circuit 18 consists of a capacitor and a resistor, and is connected to apply pulses to a control grid of vacuum tube 16. A plate resistor 20 is connected to a plate of the vacuum tube 16 and also to a capacitor 22 to energize the tube 16 and the capacitor 22. The plate of the vacuum tube 16 is connected to generate pulses of a sawtooth form 60 and to apply the sawtooth pulses 60 to a pulse generator and inverter circuit 24. The pulse generator and inverter circuit 24 consists of a vacuum tube 26 and a transformer 28. The transformer 28 has a primary winding 30 connected between a plate of the vacuum tube 26 and a source of positive potential. The secondary winding 32 of the transformer 28 is connected at one end to a first rectifier tube 34 to rectify transformed voltages. The primary winding 30 of transformer 28 is connected at one end to a second rectifier tube 36. The cathodes of the rectifier tubes 34 and 36 are energized by means of separate windings of the secondary of transformer 28. Rectifier tube 34 is connected to a filtering circuit 38 wherein pulses may be smoothed to form an unvarying potential. Rectifier tube 36 is connected to a filtering circuit 30 which functions similarly to the filter 38. Filtering circuits 38 and 40 are connected to supply voltages to dynode electrodes 41, and a photocathode electrode 43 respectively of an image orthicon tube 42. Filtering circuit 40 also has its output connected to a vacuum tube 44 by means of a resistance-capacitance circuit 46. The vacuum tube 44 and a vacuum tube 48 with their associated circuitry form a D. C. amplifier circuit 50. The function of the D. C. amplifier circuit 50 is to pass a direct current of varying magnitude controlled by the direct current signal received from the filter circuit 40. The D. C. amplifier has no effect on the sawtooth pulses 60. A voltage sensing circuit consisting of a resistance 52 and a capacitance 54 in parallel relationship and a resistance 56 serially connected with resistance 52 and capacitance 54 is coupled from the output terminal of filter 38 to the output terminal of filter 40. At a point between resistance 52 and resistance 56 a control grid of a vacuum tube 58 is connected for control purposes. Vacuum tube 58 with its associated circuitry forms a regulator circuit 70. A condensor 60 and a resistance-capacitance circuit 62 are connected to a plate of the vacuum tube 58 for stabilization purposes. The plate of tube 58 is also serially connected to the secondary winding 32 of the transformer 28.

Consider now the operation of the circuit of the drawing. At the time when no pulses 14 are present at the grid of the vacuum tube 16 the tube is cut off and electric current is passing through the resistance 20 and charging the capacitor 22. Upon the arrival of a pulse 14, tube 16 is rendered conductive and the charge formerly deposited on capacitor 22 is rapidly discharged through the vacuum tube 16 thereby forming the sawtooth pulses 60. The sawtooth voltage pulses 60 cause the vacuum tube 26 to generate a sawtooth current wave in response to the sawtooth voltage on its grid. At a time when the current in the vacuum tube 26 reaches the apex of a sawtooth cycle, the current in the primary winding 30 of transformer 28 is very high. Now when vacuum tube 26 is cutoff by the return to low voltage by the sawtooth wave, the electric energy stored in the primary winding 30 of the transformer 28, in the form of electric current has no discharge path. The inductive nature of primary winding 28 and the electrical current present in the winding 30 will cause a high voltage to be generated at the plate of tube 26 when the current in the winding 30 has no discharge path. The high voltage so generated will be in a pulse form similar to pulse wave 62. The pulse wave 62 is also generated in the secondary winding 32 by the inductive coupling, of the transformer 28, however, the voltage appearing in the secondary winding 32 of the transformer 28 will have reversed polarity, due to transformer action. It may therefore be seen that the rectifier tube 34 will receive a highly positive pulse wave, and the rectifier tube 36 will receive a highly negative pulse wave. The positive and negative pulse waves received respectively by the rectifier tubes 34 and 36 are due to the pulse inverting characteristic of transformer 28. The rectifier tubes 34 and 36 are connected to pass only the positive and negative components respectively of the pulse signals received. The positive voltage component passed by the rectifier tube 34 is filtered and smoothed in the usual manner in the filter circuit 38 and is then applied to the dynode electrodes 41 of the image orthicon tube 42. The negative voltage which passes through the rectifier tube 36 is similarly filtered in the filtering circuit 40 and applied to the photocathode 43 of the image orthicon tube 42.

Consider now the potential level of the negative voltage which is applied to the photocathode 43 of the image orthicon tube 42 and the method of regulating this negative voltage. For purpose of explanation, assume that the negative voltage at the photocathode 43 becomes more negative than is desired, this will cause the grid of the D. C. amplifier input tube 44 to become more negative, due to the direct connection, which in turn will cause a decrease in current in the D. C. amplifier tube 44 causing the plate voltage of tube 44 to rise. The rise of voltage at the plate of tube 44 is applied to the grid of tube 48 to increase the current in tube 48. The current variation in tube 48 will vary the grid bias on pulse generator tube 26, causing a more negative voltage to appear at this point. This additional bias will reduce the maximum current in tube 26 and thereby diminishing the amplitude of the positive pulses 62 which are generated in the pulse generator and inverter circuit 24. The decreased amplitude of the pulses 62 generated in the pulse generator and inverter circuit 24 will of course, apply to both the positive and negative pulses, as the negative pulses are simply the positive pulses inverted. Reducing the amplitude of the negative pulses will directly reduce the amplitude of the negative direct current regulated voltage therefor compensating for the increased amplitude of the negative voltage assumed in the example. Increased amplitude variations in the negative D. C. voltage are compensated by increased amplitude of the negative pulses. The pulse variations are also present in the positive pulses.

Consider now the manner in which the positive voltage of the circuit is regulated to the desired level. The voltage at the point between resistor 52 and resistor 56 varies as the difference between the positive and the negative voltages. This voltage is used to control the current in the regulator tube 58. Due to the fact that the regulator tube 58 is serially connected with the secondary winding 32 of transformer 28, the negative rectifier tube 36, and the negative voltage load circuit, including the photocathode 43 of image orthicon 42, the same current must flow through all of these serially connected elements. Should the positive voltage at the dynode electrodes 41 drop in potential and cause the potential at the plate of tube 58 to become more positive, the pulses appearing across the secondary winding 32 of the transformer 28 would rise to compensate for the additional voltage drop in the secondary circuit including winding 32. The D. C. amplifier acts to maintain the negative voltage at the photocathode 43 unvarying. The amplitude of the pulse voltage in the secondary winding 32 therefore must equal the regulated negative voltage plus the voltage at the plate of tube 58. The voltage at the plate of tube 58 is thus the reference level for the negative pulses. The voltage available to the positive rectifier 34, is related to the voltage across the secondary 32 by the turns ratio of the transformer 28, as the voltage available to the positive rectifier 34 appears in the primary winding 30. The variation of the voltage at the plate of tube 58, which occurs when the regulated positive voltage at the dynode electrodes 41 varies, thus causes a variation in the amplitude of the positive pulses in the primary winding 30 by reflecting the voltage level of the plate of tube 58 through the secondary winding 32 of the transformer 28. It may therefore be seen that the peak voltage of the positive pulses is held at a constant value above reference potential by the negative regulating circuit including the D. C. amplifier 50 and the positive regulator circuit varies the reference potential from which both the positive and the negative pulses are generated. Due to the fact that the negative pulse amplitude is regulated, the positive pulse amplitude will also be regulated by varying the reference potential level in the secondary winding 32, which is reflected back into the primary winding 30 to vary the amplitude of the positive pulses. The negative pulses are amplitude regulated and therefore attain a predetermined amplitude from a reference potential. The positive pulses are varied proportionally with the negative pulses and are regulated not by directly controlling their amplitude, but, by varying the voltage at the plate of the tube 58. The tube 58 represents a variable load which is utilized to vary the amount of voltage added to the pulse waveform, thereby controlling the positive pulse amplitude.

It may be seen that the circuit could be utilized for generating constant amplitude pulses rather than unvarying direct potential.

The invention claimed is:

1. A regulated voltage supply system comprising a means for generating electric pulses, said pulses having a reference level, means for controlling the magnitude of said electric pulses with respect to said reference level, pulse inverting means for reversing the polarity of said electric pulses to form inverted pulses, said inverted pulses also having a reference level, said pulse inverting means being connected to said pulse generating means, means to vary the reference potential level of said electric pulses and said inverted pulses, means for developing a first control bias which varies as the magnitude of said inverted pulses, means for connecting said first control bias to said pulse magnitude control means to control the magnitude of said electric pulses, means for developing a second control bias which varies as the difference between the amplitudes of said electric pulses and said inverted pulses, means connecting said second control bias to said pulse inverting means for controlling the reference level of said electric pulses and said inverted pulses.

2. A regulated voltage supply system comprising means for generating electric pulses, said pulses having a reference level, means for controlling the magnitude of said electric pulses with respect to said reference level, pulse inverting means for reversing the polarity of said electric pulses to form inverted pulses, said inverted pulses also having a reference level, said pulse inverting means being connected to said pulse generating means, means to vary the reference potential level of said electric pulses and said inverted pulses, means for developing a first control bias which varies as the magnitude of said inverted pulses, means for connecting said first control bias to said pulse magnitude control means to control the magnitude of said electric pulses, means for developing a second control bias which varies as the difference between the amplitudes of said electric pulses and said inverted pulses, means connecting said second control bias to said pulse inverting means for controlling the reference level of said electric pulses and said inverted pulses, rectifying means to rectify said electric pulses and said inverted pulses to form unvarying voltage.

3. Apparatus according to claim 2 wherein said rectifying means comprises a first unilateral conducting device, a filtering circuit coupled to receive said electric pulses, a second unilateral conducting device and a second filtering circuit connected to receive said inverted pulses.

4. A circuit for generating a plurality of regulated voltages; said circuit comprising means for generating sawtooth waves, means coupled to said sawtooth wave generating means for generating high voltage pulses, means for reversing the polarity of said high voltage pulses, a first rectifying means coupled to said pulse generating means, a second rectifying means coupled to said polarity reversing means, means for varying the amplitude of said sawtooth wave generating means, feedback means from one of said rectifying means for controlling said means for varying the amplitude of said sawtooth wave generating means, means for comparing voltages of the plurality of said rectifying means, said comparing means being coupled to said polarity reversing means, said comparing means being operative to vary a reference potential of said polarity reversing means.

5. A circuit for generating regulated voltages for an image orthicon television camera, said circuit comprising means for generating sawtooth waves, means coupled to said sawtooth wave generating means for developing voltage pulses, a first voltage rectifier coupled to said pulse developing means, said voltage rectifier being operative to generate a positive output voltage, a second high voltage rectifier coupled to said pulse developing means by a transformer, said second high voltage rectifier being operative to generate a negative output voltage, regulating means including a path for feedback of the negative output voltage to control shunt loading means coupled to the sawtooth wave generating means, means for comparing the positive output voltage and the negative output voltage, an electron tube having a control electrode and an anode, said control electrode being coupled to said voltage comparing means, said anode being operative to vary the direct potential at the secondary winding of said transformer.

6. In a dual voltage generating circuit having a transformer coupled to a source of electric energy, said transformer having at least one winding, means for regulating the ratio between the dual voltages generated in said circuit comprising, means responsive to the dual voltages for deriving a voltage ratio signal, a ratio regulating means coupled to said ratio signal deriving means, said ratio regulating means being coupled to at least one winding of said transformer, said ratio regulating means being operative to control reference potential of said transformer winding.

7. The ratio regulating circuit defined in claim 6 and wherein said ratio regulating means comprises an electron tube having at least a control electrode and a collecting electrode, said control electrode being coupled to said means for deriving a ratio signal, said collecting electrode being connected to a capacitor for stabilizing the potential of said collecting electrode, said collecting electrode and said capacitor being further connected to said transformer winding whereby the transformer winding reference potential is controlled by said electron tube and is stabilized by said capacitor.

8. A circuit for generating direct voltages, said circuit comprising means for generating sawtooth waves, means coupled to said sawtooth wave generating means for generating voltage pulses, a transformer having at least a primary winding and a secondary winding, said primary winding being coupled to said pulse generating means, a first rectifying means coupled to the primary winding of said transformer, said first rectifying means being operative to generate a first direct voltage, a second rectifying means coupled to the secondary winding of said transformer, said second rectifying means being operative to generate a second direct voltage, a first regulating means coupled between said second direct voltage and said sawtooth wave generating means, means responsive to the difference between said first direct voltage and said second direct voltage for deriving a voltage comparison signal, voltage ratio regulating means coupled to said comparison signal deriving means, said ratio regulating means being further coupled to said transformer, said ratio regulating means being operative to control a reference potential of said transformer.

9. The voltage generating circuit defined in claim 6 and wherein said ratio regulating means comprises an electron tube having at least a control electrode and a collecting electrode, said control electrode being coupled to said comparison signal deriving means, said collecting electrode being connected to a capacitor for maintaining a stable reference potential, said collecting electrode and said capacitor being further coupled to the secondary winding of said transformer, whereby the secondary winding of said transformer is held to a reference potential determined by said electron tube and stabilized by said capacitor.

10. The voltage generating circuit defined in claim 6 and wherein said first regulating means comprises a shunt loading electron tube coupled to the sawtooth wave generating means, said shunt loading electron tube having a control electrode, said control electrode being coupled by a feedback path to said second direct voltage.

11. The voltage generating circuit defined in claim 6 and wherein said sawtooth wave is amplified by an electron tube having at least a control electrode, said first regulating means including a feedback path coupled between the said second direct voltage rectifying means and the control electrode of said amplifying electron tube whereby the control electrode of said electron tube is biased in accordance with said second direct voltage output.

No references cited